United States Patent
Maehara et al.

(10) Patent No.: US 12,378,147 B2
(45) Date of Patent: Aug. 5, 2025

(54) METHOD OF PRODUCING MELT, METHOD OF PRODUCING GLASS ARTICLE, MELTING APPARATUS, AND EQUIPMENT FOR PRODUCING GLASS ARTICLE

(71) Applicant: AGC Inc., Tokyo (JP)

(72) Inventors: Terutaka Maehara, Tokyo (JP); Yoji Doi, Tokyo (JP); Takashi Enomoto, Tokyo (JP); Akifumi Niwa, Tokyo (JP); Shuntaro Hyodo, Tokyo (JP)

(73) Assignee: AGC Inc., Tokyo (JP)

( * ) Notice: Subject to any disclaimer, the term of this patent is extended or adjusted under 35 U.S.C. 154(b) by 91 days.

(21) Appl. No.: 17/452,812

(22) Filed: Oct. 29, 2021

(65) Prior Publication Data
US 2022/0048802 A1    Feb. 17, 2022

Related U.S. Application Data

(63) Continuation of application No. PCT/JP2020/007429, filed on Feb. 25, 2020.

(30) Foreign Application Priority Data

May 8, 2019   (JP) .................. 2019-088465

(51) Int. Cl.
C03B 5/027        (2006.01)
C03B 25/02        (2006.01)

(52) U.S. Cl.
CPC .............. *C03B 5/027* (2013.01); *C03B 25/02* (2013.01)

(58) Field of Classification Search
None
See application file for complete search history.

(56) References Cited

U.S. PATENT DOCUMENTS 3,912,477 A     10/1975   Brady et al.
3,944,713 A      3/1976   Plumat et al.
4,017,674 A *    4/1977   Chapman ............. H05B 3/0014
                                                      373/124

(Continued)

FOREIGN PATENT DOCUMENTS

DE       39 12 311 C1     8/1990
EP       0 035 850 A1     9/1981

(Continued)

OTHER PUBLICATIONS

WO 2019/124271 machine translation, Sakurabayashi et al., Method for producing glass plate, Jun. 2019 (Year: 2019).*

(Continued)

*Primary Examiner* — Queenie S Dehghan
(74) *Attorney, Agent, or Firm* — Oblon, McClelland, Maier & Neustadt, L.L.P.

(57) ABSTRACT

A method of producing a melt includes contacting a first heating element directly with an inside of a solid-liquid mixture layer including a batch raw material of glass and a mixture of solid and liquid phases denatured from the batch raw material to apply thermal energy to the solid-liquid mixture layer by heat transfer from the first heating element, supplying the batch raw material from the above of the solid-liquid mixture layer, and continuously producing a liquid phase melt with a bulk density greater than that of the solid-liquid mixture layer in a lower layer in contact with the solid-liquid mixture layer.

8 Claims, 10 Drawing Sheets

(56) References Cited

U.S. PATENT DOCUMENTS

| | | | |
|---|---|---|---|
| 4,161,617 A | 7/1979 | Hrycik et al. | |
| 4,468,164 A * | 8/1984 | Dunn | C03B 3/00 |
| | | | 65/335 |
| 4,737,966 A | 4/1988 | Palmquist | |
| 4,809,294 A | 2/1989 | Daudin et al. | |
| 4,927,446 A | 5/1990 | Manabe et al. | |
| 6,883,349 B1 | 4/2005 | Jeanvoine | |
| 2012/0167631 A1 | 7/2012 | Sakamoto | |
| 2012/0272685 A1 * | 11/2012 | Pauli | C03B 5/0336 |
| | | | 65/121 |
| 2014/0366584 A1 | 12/2014 | Maugendre et al. | |
| 2021/0078892 A1 | 3/2021 | Maehara et al. | |
| 2021/0122658 A1 | 4/2021 | Hasegawa et al. | |

FOREIGN PATENT DOCUMENTS

| | | |
|---|---|---|
| EP | 1 484 770 A1 | 12/2004 |
| JP | 53-054217 A | 5/1978 |
| JP | 53-124522 A | 10/1978 |
| JP | 54-144416 A | 11/1979 |
| JP | 63-069720 A | 3/1988 |
| JP | 63-185831 A | 8/1988 |
| JP | 2002-536277 A | 10/2002 |
| JP | 2016-124750 A | 7/2016 |
| KR | 20110091918 A * | 8/2011 ............... C03B 5/08 |
| WO | WO 2019/054385 A1 | 3/2019 |
| WO | WO 2019/244802 A1 | 12/2019 |
| WO | WO 2021/117618 A1 | 6/2021 |

OTHER PUBLICATIONS

Doi et al., "Thermal diffusivity of soda-lime-silica powder batch and briquettes", Glass Technology: European Journal of Glass Science and Technology Part A, vol. 59, No. 3, Jun. 2018, pp. 94-104.

Doi et al., "Effects of particle size and briquetting of soda-lime-silicate glass batch on viscosity during batch-to-melt conversion", International Journal of Applied Glass Science, vol. 10, Aug. 2018, pp. 1-10.

* cited by examiner

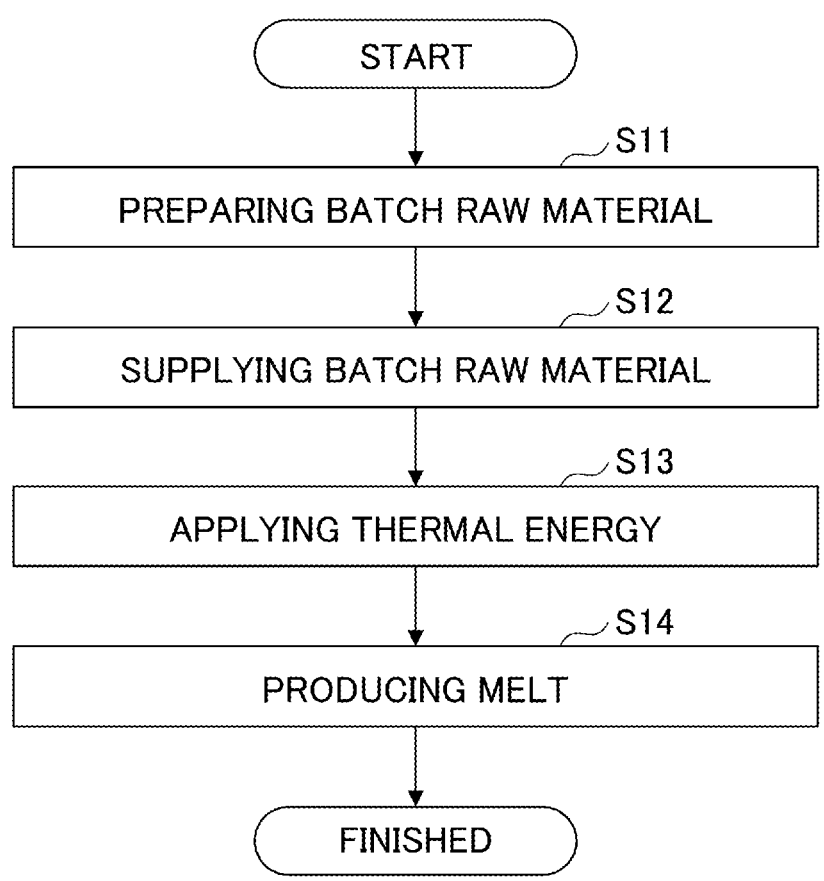

FIG.5B
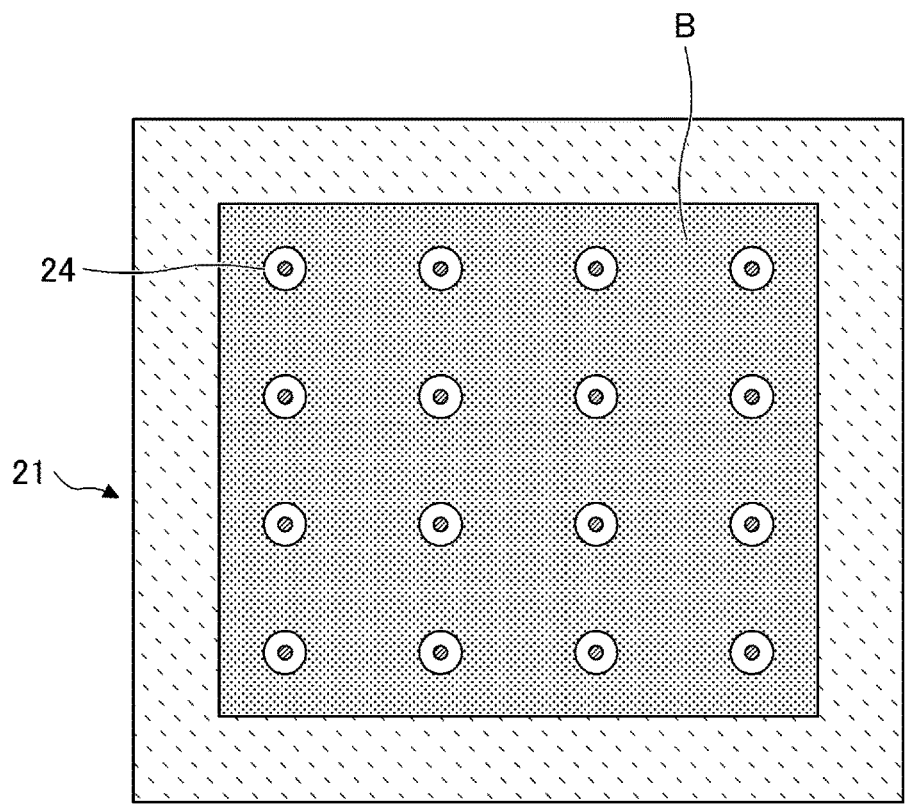
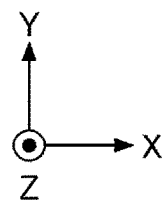

METHOD OF PRODUCING MELT, METHOD OF PRODUCING GLASS ARTICLE, MELTING APPARATUS, AND EQUIPMENT FOR PRODUCING GLASS ARTICLE

CROSS-REFERENCE TO RELATED APPLICATIONS

This U.S. non-provisional application is a continuation of PCT International Application PCT/JP2020/007429 filed on Feb. 25, 2020 and designated the U.S., which is based on and claims priority to Japanese Patent Applications No. 2019-088465 filed on May 8, 2019, with the Japan Patent Office. The entire contents of these applications are incorporated herein by reference.

BACKGROUND OF THE INVENTION

1. Field of the Invention

The present disclosure relates to a method of producing a melt, a method of producing a glass article, a melting apparatus, and an equipment for producing a glass article.

2. Description of the Related Art

Conventionally, various methods of melting batch raw materials of glass and producing melts have been proposed (for example, Patent Documents 1 to 7).

Patent Document 1 (U.S. Unexamined Patent Application Publication No. 2012/0167631) discloses a method of inputting batch raw materials into a vessel to contain a melt layer and heating the falling batch raw materials with a flame of a burner.

Patent Document 2 (Japanese Unexamined Patent Application Publication (Translation of PCT Application) No. JP 2002-536277A) discloses a method of installing a liquid burner inside a melt layer contained in a vessel and heating the melt layer with a flame of the liquid burner.

Patent Document 3 (U.S. Pat. No. 3,944,713) discloses a method of forming a pile of raw materials of batch raw materials on a group of pipes and preheating the group of pipes and the piles of raw materials with the heat of exhaust gas. In this method, the group of pipes and a vessel to contain a melt layer are spaced apart from each other.

Patent Document 4 (U.S. Pat. No. 4,927,446) discloses a method of installing a lattice shaped resistive heating element inside of a melt layer contained in a vessel and heating the melt layer with the resistive heating element. According to this method, the convection of the melt layer can be controlled.

Patent Document 5 (U.S. Pat. No. 3,912,477) discloses a method of installing an elongated heating element with an elliptical cross-sectional view inside a melt layer contained in a vessel and heating the melt layer with the heating element. According to this method, as in Patent Document 4, the convection of the melt layer can be controlled.

Patent Document 6 (U.S. Unexamined Patent Application Publication No. 2012/0272685) discloses a method of preheating a batch raw material with a group of tubes or the like. In this method, the group of tubes and the vessel to contain the melt layer are provided spaced apart from each other.

Patent Document 7 (U.S. Pat. No. 4,468,164) discloses a method of forming a pile of raw material of a batch raw material as the upper layer of the melt layer contained in a vessel and inserting an arc electrode into the pile of raw material from above, and arc heating the interface between the pile of raw material and the melt layer.

SUMMARY OF THE INVENTION

Technical Problem

Various reactions occur before batch raw materials of glass are melt and the melts are produced. Most of these reactions are accompanied by heat absorption, which consumes a large amount of thermal energy. Until the heat absorptive reaction is completed, the batch raw materials are not completely melted, and the batch raw materials contain a large number of pores therein. Pores reduce a bulk density and reduce a thermal diffusivity. Therefore, it is necessary to provide a large amount of thermal energy to the batch raw materials efficiently. However, it is difficult with conventional techniques and the techniques suggested therein to efficiently provide a large amount of thermal energy to batch raw materials.

One aspect of the present disclosure provides a technique for efficiently heating a solid-liquid mixture layer including a batch raw material and a mixture of liquid and solid phases denatured from the batch raw material, and efficiently producing a continuous melt layer in the solid-liquid mixture layer.

Means for Solving the Problems

[1] A method of producing a melt according to an aspect of the present disclosure includes directly contacting a first heating element with an inside of a solid-liquid mixture layer including a batch raw material of glass and a mixture of solid and liquid phases denatured from the batch raw material to apply thermal energy to the solid-liquid mixture layer by heat transfer from the first heating element, supplying the batch raw material from above the solid-liquid mixture layer, and continuously producing a liquid phase melt having a bulk density greater than that of the solid-liquid mixture layer in a lower layer in contact with the solid-liquid mixture layer.

[2] The method according to the above [1] includes a thermal diffusivity of the solid-liquid mixture layer that is 3 $mm^2$/second or less.

[3] The method according to the above [1] or [2], further includes directly contacting a second heating element with an inside of a melt layer formed of the melt to apply thermal energy to the melt layer by heat transfer from the second heating element.

[4] The method according to any one of the above [1] to [3] includes that the solid-liquid mixture layer covers 70% or more of an upper surface of the melt layer formed of the melt.

[5] A method of producing a glass article according to an aspect of the present disclosure includes further forming the melt produced by the method according to any one of the above [1] to [4], annealing a formed glass, and processing the annealed glass into a glass article.

[6] A continuous-type melting apparatus according to an aspect of the present disclosure includes a housing portion configured to house a melt layer formed of a melt obtained from a batch raw material of glass and a solid-liquid mixture layer including the batch raw material and a mixture of solid and liquid phases denatured from the batch raw material as an upper layer contacting with the melt layer, a charging portion to charge the batch raw material to the housing portion, and a first heating element placed at a position corresponding to an inside of a predetermined solid-liquid mixture layer to apply thermal energy to the solid-liquid mixture layer by heat transfer by directly contacting an inside of the solid-liquid mixture layer.

[7] In the apparatus according to the above [6], two or more of the first heating elements are arranged at intervals in the horizontal direction.

[8] In the apparatus according to the above [6], two or more of the first heating elements are arranged at intervals in the vertical direction.

[9] In the apparatus according to anyone of the above [6] to [8], the first heating element includes an electric resistance heating element.

[10] The apparatus according to any one of the above [6] to [9], further includes a second heating element placed at a position corresponding to an inside of a predetermined melt layer to apply thermal energy to the melt layer by heat transfer by directly contacting an inside of the melt layer.

[11] In the apparatus according to the above [10], the first heating element and the second heating element are arranged continuously on the same vertical line and are integrated.

[12] In the apparatus according to any one of the above [6] to [11], the charging portion is placed at a position corresponding to above a predetermined melt layer and the predetermined solid-liquid mixture layer.

[13] The apparatus according to any one of the above [6] to [12], further includes a moving portion placed at a position capable of covering the entire predetermined melt layer from above with the solid-liquid mixture layer, wherein the moving portion moves the charging portion.

[14] An equipment for producing a glass article according to an aspect of the present disclosure includes the melting apparatus of any one of the above [6] to [13], a forming apparatus configured to form a melt obtained from the melting apparatus, and an annealing apparatus to anneal a formed glass, and a processing apparatus to process the annealed glass into a glass article.

Effects of the Invention

According to an aspect of the present disclosure, the present disclosure provides a technique for efficiently heating a solid-liquid mixture layer including a batch raw material and a mixture of liquid and solid phases denatured from the batch raw material, and efficiently producing a continuous melt layer in the solid-liquid mixture layer.

BRIEF DESCRIPTION OF THE DRAWINGS

FIG. 4 is a flowchart illustrating a method of producing a melt according to an embodiment;

FIG. 5B is a plan cross-sectional view illustrating the melting apparatus according to the first modified example, the plan cross-sectional view being taken along the line VB-VB of FIG. 5A;

DETAILED DESCRIPTION OF THE PREFERRED EMBODIMENTS

Figure 1:
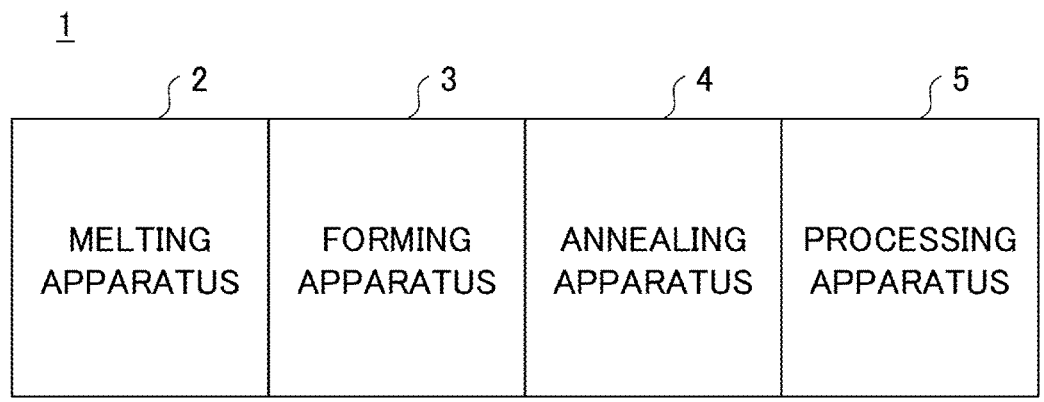
FIG. 1 is a diagram illustrating equipment for producing a glass article according to an embodiment.

Hereinafter, embodiments of the present disclosure will be described with reference to the accompanying drawings. In the drawings, the same or corresponding components will be denoted by the same reference numerals, and description thereof will be omitted.

(Producing Apparatus of Glass Article)

FIG. 1 is a diagram illustrating equipment for producing a glass article according to an embodiment. As illustrated in FIG. 1, the equipment for producing a glass article 1 includes a melting apparatus 2, a forming apparatus 3, an annealing apparatus 4, and a processing apparatus 5.

The melting apparatus 2 melts a batch raw material of glass and produces a melt. The batch raw material contains a plurality of kinds of glass raw materials of different chemical composition. Glass raw materials are determined according to the composition of glass. When glass is soda-lime glass, for the composition of the glass, in mol % on an oxide basis, $SiO_2$ content is 50% or more and 75% or less, $Al_2O_3$ content is 0% or more and 20% or less, the total content of $Li_2O$, $Na_2O$, and $K_2O$ is 5% or more and 25% or less, and the total content of MgO, CaO, SrO, and BaO is 0% or more and 20% or less. If the glass is soda-lime glass, batch raw materials include, for example, quartz sand, limestone, soda ash, boric acid, fining agents, and the like. Examples of fining agents include sulfur trioxide, a chloride, fluoride, or the like. The batch raw materials may contain glass cullet in addition to glass raw materials to recycle the glass. The batch raw materials may be a powder raw material or a granulated raw material obtained by granulating the powder raw material. The melting apparatus 2 is a continuous processing-type apparatus and continuously performs the charging of batch raw materials and the production of melt. The amount of batch raw material charged to the apparatus per unit time is substantially equal to the discharge amount of the melt from the apparatus per unit time. Details of the melting apparatus 2 will be described later.

The forming apparatus 3 forms the melt obtained in the melting apparatus 2 into a glass of a desired shape. As a method of forming to obtain a plate-shaped glass, a float method, a fusion method, a roll out method, or the like is used. As a method of forming to obtain a tubular glass, Vello method, Danner method, or the like is used. As a method of forming to obtain glass of other shapes, a press method, a blow method, a casting method, or the like is used.

The annealing apparatus 4 anneals the glass formed by the forming apparatus 3. The annealing apparatus 4 includes, for example, an annealing furnace and a conveying roller for conveying glass in a desired direction inside the annealing furnace. A plurality of conveying rollers is arranged at intervals in the horizontal direction. The glass is annealed while being conveyed from the inlet to the outlet of the annealing furnace. When glass is annealed, a glass with less residual strain is obtained.

The processing apparatus 5 processes the annealed glass by the annealing apparatus 4 into a glass article. The processing apparatus 5 may be, for example, one or more machines selected from a cutting machine, a grinding machine, a polishing machine, and a coating machine. The cutting machine cuts out the glass article from the annealed glass which is formed by the annealing apparatus 4. For example, in the cutting machine, a scribe line is formed in the annealed glass which is formed by the annealing apparatus 4, and the annealed glass is cut along the scribe line. The scribe line is formed using a cutter or a laser ray. The grinding machine grinds the annealed glass which is formed by the annealing apparatus 4. The polishing machine polishes the annealed glass which is formed by the annealing apparatus 4. The coating machine forms a desired film on the annealed glass which is formed by the annealing apparatus 4.

In addition, the equipment for producing a glass article 1 may further include a fining apparatus. The fining apparatus removes air bubbles contained in the melt prior to forming the melt obtained in the melting apparatus 2 in the forming apparatus 3. As a method of removing air bubbles, for example, one or more methods selected from a method of reducing the pressure of the ambient atmosphere of the melt and a method of heating the melt to a high temperature are used.

(Method of Producing Glass Article)

Figure 2:
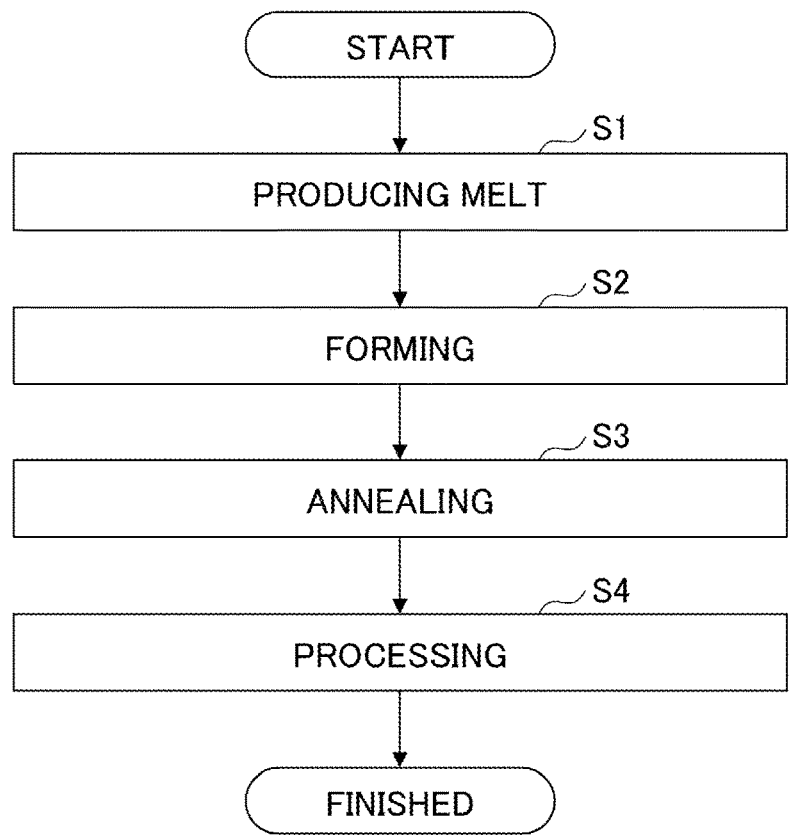
FIG. 2 is a flowchart illustrating a method of producing a glass article according to an embodiment.

FIG. 2 is a flowchart illustrating a method of producing a glass article according to an embodiment. As illustrated in FIG. 2, a method of producing a glass article includes producing of a melt (S1), forming (S2), annealing (S3), and processing (S4). The melting apparatus 2 produces a melt (S1), the forming apparatus 3 forms the melt (S2), the annealing apparatus 4 anneals the melt (S3), and the processing apparatus 5 processes the annealed melt (S4). Note that the method of producing a glass article may further include fining. Fining is the removal of air bubbles contained in the melt and is performed after producing the melt (S1) and before the forming (S2).

(Melting Apparatus)

Figure 3A:
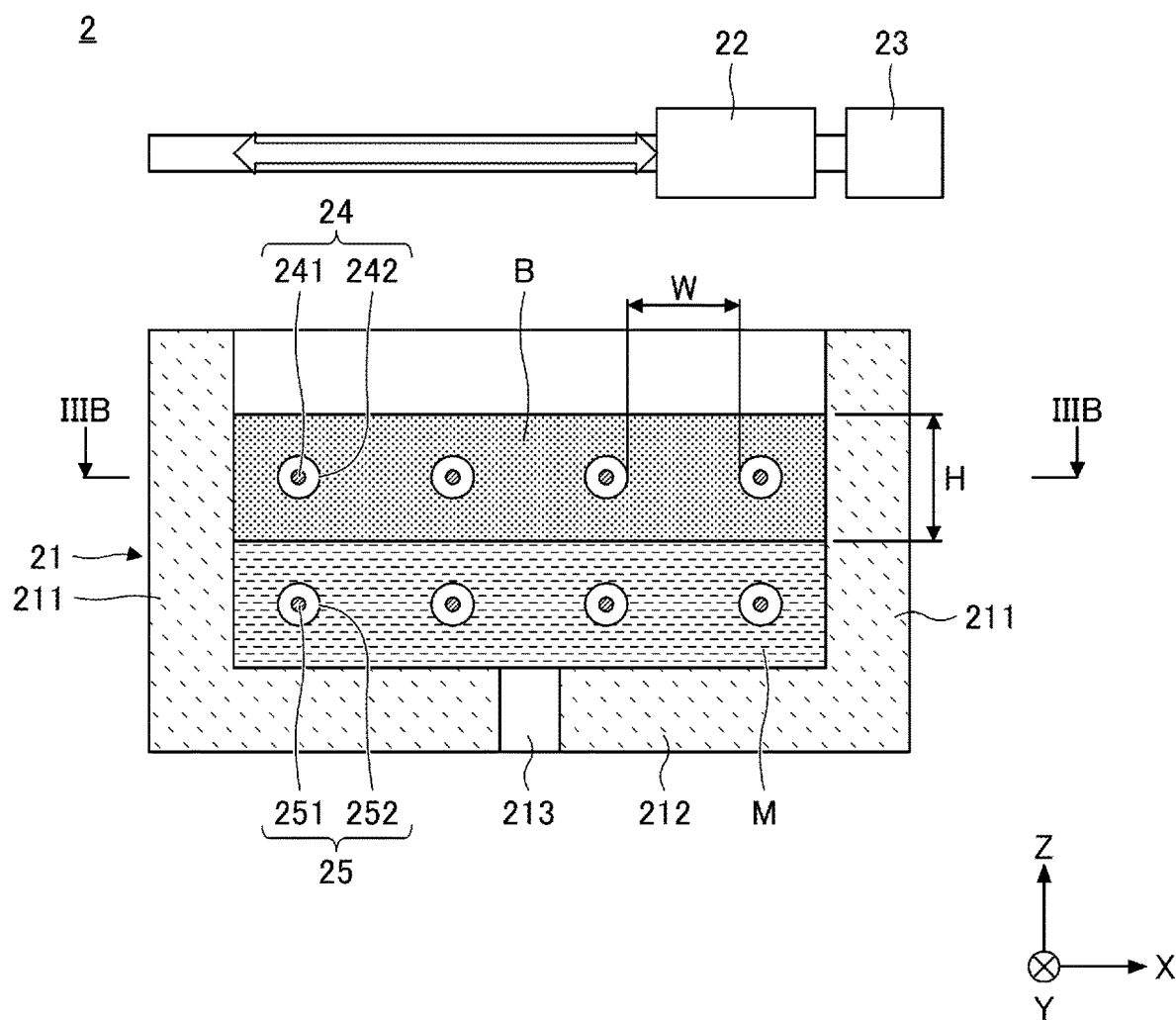
FIG. 3A is an elevational cross-sectional view illustrating a melting apparatus according to an embodiment.
Figure 3B:
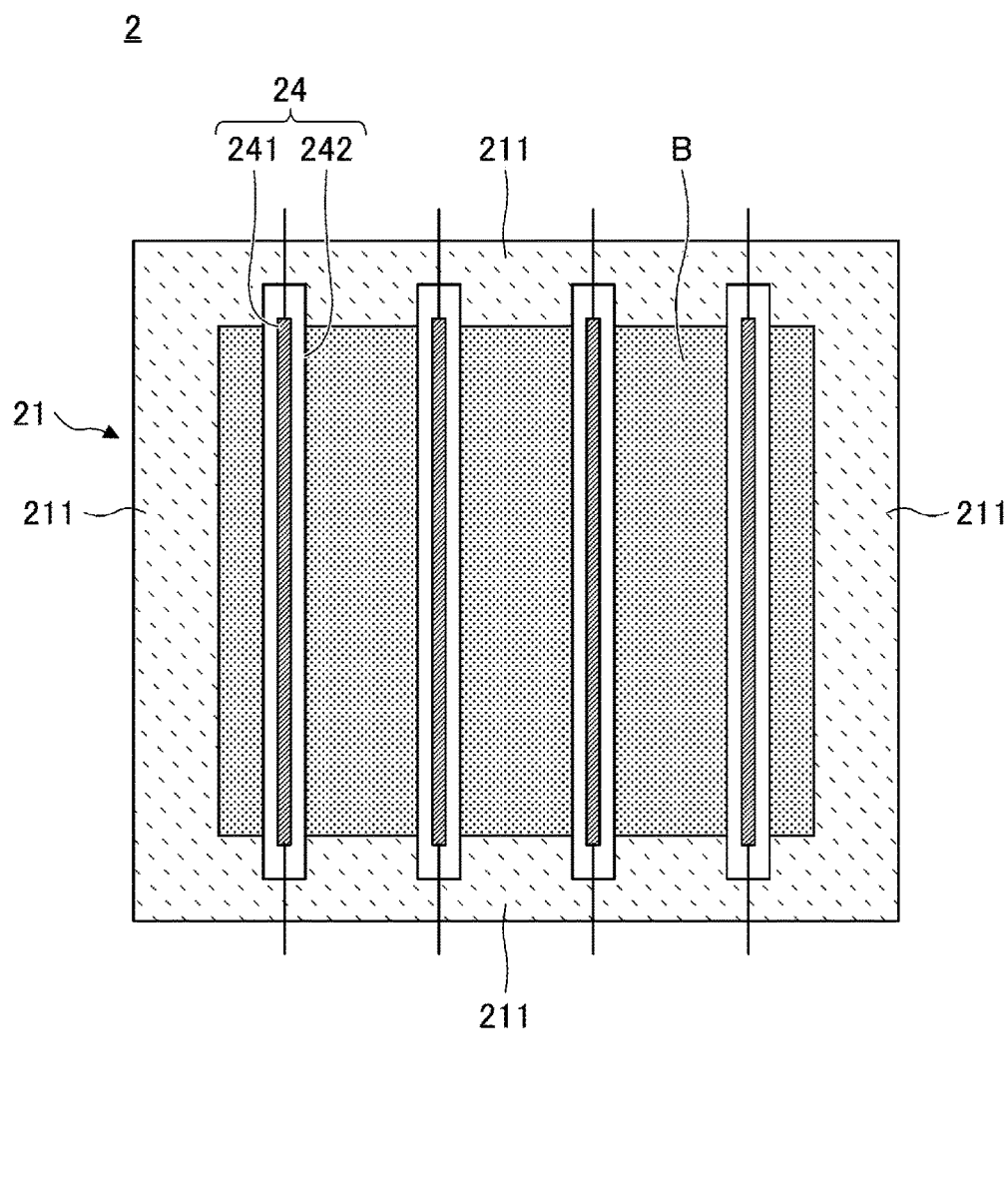
FIG. 3B is a plan cross-sectional view illustrating the melting apparatus according to an embodiment, the plan cross-sectional view being taken along the line IIIB-IIIB of FIG. 3A.

FIG. 3A is an elevational cross-sectional view illustrating a melting apparatus according to an embodiment. FIG. 3B is a plan cross-sectional view illustrating the melting apparatus according to an embodiment, the plan cross-sectional view being taken along the line IIIB-IIIB of FIG. 3A. In FIGS. 3A and 3B, the X-axis direction, the Y-axis direction, and the Z-axis direction are directions perpendicular to each other. The X-axis direction and the Y-axis direction are horizontal directions, and the Z-axis direction is a vertical direction. The same is true of the cross-sectional view of the melting apparatus according to the following modified examples.

The melting apparatus 2 melts a batch raw material of glass to produce a melt. The batch raw material is a powder raw material or a granulated raw material and contains a plurality of kinds of glass raw materials of different chemical composition. Therefore, various reactions occur before a batch raw material of glass is melt and the melt is produced. Most of these reactions are accompanied by a heat absorption, which consumes a large amount of thermal energy. Reactions involving a heat absorption include, for example, vaporization of water, pyrolysis of carbonates, and reaction of silica sand with carbonates. Until the heat absorptive reaction is completed, the batch raw material is not completely melted. This is a state of a solid-liquid mixture layer.

The melting apparatus 2 has a housing portion 21, and the housing portion 21 houses a melt layer M and a solid-liquid mixture layer B. The melt layer M is formed from a melt obtained from a batch raw material. The solid-liquid mixture layer B is formed as an upper layer in contact with the melt layer M, and includes the batch raw material and the mixture of liquid and solid phases denatured from the batch raw material. The solid-liquid mixture layer B contains a large number of pores as compared with the melt layer M. Therefore, the solid-liquid mixture layer B has a low bulk density and a low thermal diffusivity. The thermal diffusivity of the solid-liquid mixture layer B is, for example, 3 $mm^2$/second or less, and the thermal diffusivity of the melt layer M is, for example, more than 3 $mm^2$/second. Thermal diffusivity is measured by the method described in Glass Technology: European Journal of Glass Science and Technology Part A, June 2018, Volume 59 Number 3, Pages 94-104. Further, the bulk density of the solid-liquid mixture layer B is 90% or less of the bulk density of the melt layer M. The bulk density is measured by storing a batch raw material in a cylindrical crucible made of transparent quartz or transparent sapphire, placing the crucible containing the batch raw material in an electric furnace, and observing the volume change of the batch raw material with a camera while heating the batch raw material in an electric furnace. The bulk density is measured by the method described in International Journal of Applied Glass Science, August 2018, Volume 10, Pages 115-124.

The housing portion 21 is in contact with the melt layer M and the solid-liquid mixture layer B. Therefore, the housing portion 21 is made of a material having high corrosion resistance to the melt layer M and the solid-liquid mixture layer B. When the atmosphere of the housing portion 21 is an air atmosphere and the temperature of the atmosphere is lower than 800° C., the housing portion 21 is formed of one or more materials selected from, for example, bricks, stainless steel, Inconel, and nickel. In addition, when the atmosphere of the housing portion 21 is an air atmosphere and the temperature of the atmosphere is 800° C. or higher, the housing portion 21 is formed of one or more materials selected from bricks, platinum, a platinum rhodium alloy, and ceramics. In addition, when the atmosphere of the housing portion 21 is an inert atmosphere and the temperature of the atmosphere is 800° C. or higher, the housing portion 21 is formed of one or more materials selected from bricks, molybdenum, tungsten, and iridium.

The housing portion 21 has a plurality of side walls 211 and a bottom wall 212. The plurality of side walls 211 are assembled into, for example, a rectangular cylindrical shape, and a housing chamber for housing the melt layer M and the solid-liquid mixture layer B is formed inside the assembly. The bottom wall 212 closes the bottom of the housing chamber. While the housing portion 21 has a melt outlet 213 at the bottom wall 212 in FIG. 3A, the melt outlet 213 may be provided at the side walls 211 of the housing portion 21.

The melting apparatus 2 has a charging portion 22, and the charging portion 22 charges a batch raw material to the housing portion 21. A known batch charger is used as the charging portion 22. The charging portion 22 periodically supplies the batch raw material into the housing portion 21 and continuously forms the solid-liquid mixture layer B on the melt layer M. The amount of the batch raw material supplied per unit time is substantially equal to the amount of the batch raw material discharged per unit time when the amount of the batch raw material supplied per unit time is converted into the glass weight.

The charging portion 22 is placed above the predetermined melt layer M and at a position corresponding to an upper portion of the predetermined solid-liquid mixture layer B. In other words, when viewed from above, the charging portion 22 is disposed at a position overlapping with the melt layer M and the solid-liquid mixture layer B. In the charging portion 22, the batch raw material is charged from above the melt layer M and the solid-liquid mixture layer B. Therefore, 70% or more of the upper surface of the hot melt layer M can be covered with the low-temperature solid-liquid mixture layer B. As a result, this prevents heat and volatile components from escaping from the upper surface of the melt layer M. The volatile components are, for example, boric acid, fining agent, and the like. The volatile components are liquefied and collected by the low-temperature solid-liquid mixture layer B.

The melting apparatus 2 may have a moving portion 23, and the moving portion 23 moves the charging portion 22 to a position where the whole of the predetermined melt layer M can be covered with the solid-liquid mixture layer B from above. The charging portion 22 is moved inside an area overlapping the melt layer M and the solid-liquid mixture layer B when viewed from above. Although the moving direction of the charging portion 22 is an X-axis direction in FIG. 3A, the moving direction may be a Y-axis direction or both of an X-axis direction and a Y-axis direction. As the moving portion 23, a known moving portion is used. Covering the entire upper surface of the hot melt layer M with the low-temperature solid-liquid mixture layer B prevents heat and volatile components from escaping from the upper surface of the melt layer M.

Meanwhile, a batch raw material changes from a solid phase to a liquid phase from an upper surface of the solid-liquid mixture layer B to a lower surface thereof. During this time, a reaction involving heat absorption takes place, so that a large amount of thermal energy is consumed. In addition, during the reaction, the batch raw material is not completely melted, and the batch raw material contains a large number of pores therein. Therefore, the thermal diffusivity of the solid-liquid mixture layer B is lower than that of the melt layer M. It is difficult to efficiently provide a large amount of thermal energy from the outside of the solid-liquid mixture layer B to the solid-liquid mixture layer B having a low thermal diffusivity. This is because heat does not appreciably enter inside of the solid-liquid mixture layer B from the outside of the solid-liquid mixture layer B.

Therefore, the melting apparatus 2 of the present embodiment includes a first heating element 24. The first heating element 24 is provided at a position corresponding to the inside of the predetermined solid-liquid mixture layer B, and directly contacts inside of the solid-liquid mixture layer B so that thermal energy is provided to the solid-liquid mixture layer B by heat transfer. The first heating element 24 is placed below the upper surface of the solid-liquid mixture layer B and above the lower surface of the solid-liquid mixture layer B. The first heating element 24 may be provided at a position corresponding to the inside of the predetermined solid-liquid mixture layer B beforehand. Alternatively, after charging a glass raw material into a melting apparatus, the first heating element 24 may be moved and provided at a position corresponding to the inside of the solid-liquid mixture layer B.

The first heating element 24 heats the solid-liquid mixture layer B from the inside. Therefore, most of the thermal energy of the first heating element 24 can be transferred to the solid-liquid mixture layer B without leakage, and the thermal energy can be transferred efficiently from the first heating element 24 to the solid-liquid mixture layer B. Accordingly, the solid-liquid mixture layer B can be heated efficiently, and the melt layer M continuous with the solid-liquid mixture layer B can be produced efficiently.

In addition, the heat receiving surface of the solid-liquid mixture layer B is formed not only at the boundary with the melt layer M, but also inside of the solid-liquid mixture layer B because the first heating element 24 heats the solid-liquid mixture layer B from the inside. As a result, a large amount of thermal energy can be applied to the solid-liquid mixture layer B. Thus, the amount of melt produced per unit area per day can be increased. The unit area refers to a unit area of the inner bottom surface of the housing portion 21. If the amount of melt produced by the melting apparatus 2 in a day is the same, the total area of the inner bottom surface of the housing portion 21 can be reduced, and the melting apparatus 2 can be miniaturized.

The first heating element 24 is formed, for example, in a rod shape. The cross-sectional shape is circular, but may also be oval or rectangular. The first heating element 24 is, for example, horizontally placed. A wide area of the solid-liquid mixture layer B, which spreads out horizontally, can be heated by one horizontal rod-shaped first heating element 24.

The number of the first heating element 24 may be one, but a plurality of the first heating elements 24 may be used. The more the number of first heating elements 24, the more the load on each individual first heating element 24 can be reduced. Therefore, the first heating element 24 with a smaller maximum output can be used.

The output of a plurality of the first heating elements 24 may be individually determined. The temperature distribution in the solid-liquid mixture layer B can be controlled. The temperature distribution in the solid-liquid mixture layer B may be determined so that the temperature distribution does not have an adverse effect on the convection in the melt layer M.

The plurality of first heating elements 24 is arranged, for example, parallel to each other in the Y-axis direction, and spaced apart in the X-axis direction. A wider area of the solid-liquid mixture layer B can be heated.

The distance W between the two first heating elements 24 adjacent to each other in the X-axis direction is determined based on the flowability of the batch raw material and the total amount of thermal energy given to the batch raw material. Although the distance W is not particularly limited, the distance W is preferably 10 mm or more and more preferably 20 mm or more, from the viewpoint of fluidity of the batch raw material. From the viewpoint, of the thermal energy given to the batch raw material, the distance W should not be too wide. The distance W is preferably, for example, 200 mm or less and more preferably 100 mm or less.

The plurality of first heating elements 24 is placed at the same position in the Z-axis direction in the present embodiment, but the plurality of first heating elements 24 may be placed at different positions in the Z-axis direction. The wider area of the solid-liquid mixture layer B can be heated, and the amount of melt produced per unit area per day can be further increased.

If the heat receiving surface of the solid-liquid mixture layer B is only the boundary with the melt layer M without the first heating element 24 as in the conventional case, and the thickness T of the solid-liquid mixture layer B is, for example, 100 mm, the maximum amount of the melt produced per unit area is about 2.5 tons/m$^2$ per day.

In contrast, if the thickness T of the solid-liquid mixture layer B is 150 mm and two rod-shaped first heating elements 24 with a diameter of 30 to 40 mm are placed at intervals of 50 mm in the Z-axis direction, the maximum amount of the melt produced per unit area can be improved to 6 tons/m$^2$ per day, which is 2.4 times higher than the conventional production.

In addition, if the thickness T of the solid-liquid mixture layer B is 200 mm and three rod-shaped first heating elements 24 with a diameter of 30 to 40 mm are placed at intervals of 50 mm in the Z-axis direction, the maximum amount of the melt produced per unit area can be improved to 7 tons/m$^2$ per day, which is 2.8 times higher than the conventional production.

According to the present embodiment, since the heat receiving surface of the solid-liquid mixture layer B is formed not only at the boundary with the melt layer M but also inside the solid-liquid mixture layer B, the thickness T of the solid-liquid mixture layer B can be made thicker than conventionally, and the amount of the melt produced per unit area per day can be increased.

The first heating element 24 is not particularly limited, but includes, for example, an electric resistance heating element 241. The electric resistance heating element 241 is energized and generates Joule heat. Therefore, the amount of heat generated can be controlled by controlling the power supplied from a power supply to the electric resistance heating element 241. The electric resistance heating element 241 is formed of a material selected based on the operating temperature and atmosphere, for example, MoSi$_2$ or SiC. The electric resistance heating element 241 may extend horizontally from one of the pair of side walls 211 to the other, of the housing portion 21 as illustrated in FIG. 3B. Accordingly, a wide area of the housing portion 21 can be heated.

The first heating element 24 may further include a casing 242, and the electric resistance heating element 241 may be housed inside of the casing 242. The casing 242 is formed in a tubular shape, and the electric resistance heating element 241 is enclosed inside the casing 242. The casing 242 may extend horizontally from one of the pair of side walls 211 to the other of the housing portion 21, as illustrated in FIG. 3B. A hot wire of the electric resistance heating element 241 heats the casing 242 away from the electric resistance heating element 241. The casing 242 is in direct contact with the inside of the solid-liquid mixture layer B and provides thermal energy to the solid-liquid mixture layer B through heat transfer. A corrosion of the electric resistance heating element 241 can be suppressed because the electric resistance heating element 241 does not come into direct contact with the solid-liquid mixture layer B.

The casing 242 is in direct contact with the inside of the solid-liquid mixture layer B. Therefore, the casing 242 is formed of a material that has high corrosion resistance to the solid-liquid mixture layer B. If the atmosphere in the housing portion 21 is an air atmosphere and the temperature of the atmosphere is less than 800° C., the casing 242 is formed of one or more materials selected from, for example, bricks, stainless steel, Inconel, and nickel. In addition, when the atmosphere of the housing portion 21 is an air atmosphere and the temperature of the atmosphere is 800° C. or higher, the casing 242 is formed of one or more materials selected from bricks, platinum, a platinum rhodium alloy, and ceramics. In addition, when the atmosphere of the housing portion 21 is an inert atmosphere and the temperature of the atmosphere is 800° C. or higher, the casing 242 is formed of one or more materials selected from bricks, molybdenum, tungsten, and iridium.

The first heating element 24 is not limited to the electric resistance heating element 241. For example, the first heating element 24 may have a heat exchanger tube, and the heat exchanger tube may form a flow path for the heated gas to flow inside the tube. The heat exchanger tube is in direct contact with the inside of the solid-liquid mixture layer B and provides the heat energy of the heated gas to the solid-liquid mixture layer B by heat transfer.

The first heating element 24 does not include electrodes for Joule heating the melt. Even if conventional electrodes for electrified heating are placed at the position of the first heating element 24, the solid-liquid mixture layer B cannot be heated because the electrodes cannot run a large amount of current due to the solid-liquid mixture layer B, not the melt. Furthermore, even if electrodes that generate a conventional plasma arc are placed at the position of the first heating element 24, various problems caused by the concentration of the electric field around the electrodes cannot be solved, and the solid-liquid mixture layer B cannot be effectively heated.

The melting apparatus 2 includes a second heating element 25. The second heating element 25 is provided at a position corresponding to the inside of the predetermined melt layer M, and directly contacts inside of the melt layer M so that thermal energy is provided to the melt layer M by heat transfer. The second heating element 25 is placed below the upper surface of the melt layer and above the lower surface of the melt layer. The second heating element 25 may be provided at a position corresponding to the inside of the predetermined melt layer beforehand. Alternatively, the second heating element 25 may be moved and provided at a position corresponding to the inside of the melt layer.

The second heating element 25 provides thermal energy to the melt layer M by heat transfer. The second heating element 25 can provide thermal energy to the melt layer M without depending on the electrical resistivity of the melt layer M. The electrical resistivity of the melt layer M is determined by a glass composition. The second heating element 25 can apply thermal energy to the melt layer M without depending on the glass composition. In the technology where a current is passed through the melt layer M by a pair of electrodes to generate heat in the melt layer M itself, if the electrical resistivity of the melt layer M changes, the amount of heat generated in the melt layer M will change even if the potential difference between the pair of electrodes is the same.

The second heating element 25 heats the melt layer M from the inside. Further, the second heating element 25 heats the solid-liquid mixture layer B from the boundary between the melt layer M and the solid-liquid mixture layer B. The structure, number, and arrangement of the second heating element 25 are the same as those of the first heating element 24.

The second heating element 25 is formed, for example, in a rod shape. The cross-sectional shape is circular, but may also be oval or rectangular. The second heating element 25 is, for example, horizontally placed. A wide area of the melt layer M, which spreads out horizontally, can be heated by one horizontal rod-shaped second heating element 25. Also, the thickness of the melt layer M can be reduced.

The number of the second heating element 25 may be one, but a plurality of the second heating elements 25 may be used. The more the number of second heating elements 25, the more the load on each individual second heating element 25 can be reduced. Therefore, the second heating element 25 with a smaller maximum output can be used.

The output of a plurality of the second heating elements 25 may be individually determined. The temperature distribution in the melt layer M can be controlled, and the convection in the melt layer M can be suppressed.

The plurality of second heating elements 25 is arranged, for example, parallel to each other in the Y-axis direction, and spaced apart in the X-axis direction. A wider area of the melt layer M can be heated.

It should be noted that the plurality of second heating elements 25 may be placed at different positions in the Z-axis direction. Placing the plurality of second heating elements 25 spaced apart in the Z-axis direction makes the convection of the melt layer M easier to control.

The second heating element 25 is not particularly limited, but includes, for example, an electric resistance heating element 251. The electric resistance heating element 251 is energized and generates Joule heat. Therefore, the amount of heat generated can be controlled by controlling the power supplied from a power supply to the electric resistance heating element 251.

The second heating element 25 may further include a casing 252, and the electric resistance heating element 251 may be housed inside of the casing 252. The casing 252 is formed in a tubular shape, and the electric resistance heating element 251 is enclosed inside the casing 252. The casing 252 is in direct contact with the inside of the melt layer M. Therefore, the casing 252 is formed of a material that has high corrosion resistance to the melt layer M.

The second heating element 25 is not limited to the electric resistance heating element 251. For example, the second heating element 25 may have a heat exchanger tube, and the heat exchanger tube may form a flow path for the heated gas to flow inside the tube. The heat exchanger tube is in direct contact with the inside of the melt layer M and provides the heat energy of the heated gas to the melt layer M by heat transfer.

(Method of Producing Melt)

FIG. 4 is a flowchart illustrating a method of producing a melt according to an embodiment. The method of producing a melt includes a preparation of a batch raw material (S11), a supplying of the batch raw material (S12), an application of thermal energy (S13), and a production of a melt (S14). The process illustrated in FIG. 4 is performed in a steady state. The steady state is a state in which the housing portion 21 houses the melt layer M and the solid-liquid mixture layer B.

In the preparation of batch raw material (S11), a batch raw material is set in the charging portion 22. The batch raw material contains a plurality of kinds of glass raw materials of different chemical composition. Glass raw material is determined according to the composition of glass. The batch raw material may be a powder raw material or a granulated raw material obtained by granulating the powder raw material. The preparation of the batch raw material (S11) does not have to be performed by the same person as in the subsequent processes, and the batch raw material can be purchased by the person producing the melt from another person.

In the supplying of batch raw material (S12), a batch raw material is charged into the housing portion 21 by the charging portion 22. The moving portion 23 may move the charging portion 22, and the input position of the batch raw material may be changed, and the entire melt layer M may be covered with the solid-liquid mixture layer B from above. In addition, the solid-liquid mixture layer B does not need to cover the entire melt layer M.

In the application of thermal energy (S13), heat energy is provided to the solid-liquid mixture layer B by heat transfer from the first heating element 24. In the application of thermal energy (S13), thermal energy may be imparted to the melt layer M by heat transfer from the second heating element 25. The thermal energy is transferred from the boundary between the melt layer M and the solid-liquid mixture layer B to the solid-liquid mixture layer B.

In the production of the melt (S14), a liquid phase melt in which the bulk density is larger than that of the solid-liquid mixture layer B is continuously generated in the lower layer in contact with the solid-liquid mixture layer B, for example, in the melt layer M. The melt of the melt layer M is discharged from the melt outlet 213 of the housing portion 21 and is conveyed to the forming apparatus 3. The amount of the batch raw material supplied per unit time is substantially equal to the amount of the batch raw material discharged per unit time when the amount of the batch raw material supplied per unit time is converted into the glass weight.

When the melting apparatus 2 is started up, that is, when the inside of the housing portion 21 is empty, the melting apparatus 2 firstly forms a pre-melt layer formed of a pre-melt inside the housing portion 21. The glass composition of the pre-melt layer may be the same as or different from that of the melt layer M. Even in the latter case, the melt layer M is finally formed inside the housing portion 21 by repeating the process illustrated in FIG. 4 and discharging the melt.

The raw material of the pre-melt may be the same as or different from the batch raw material. In addition, the raw material of the pre-melt may be a mixture of a plurality of glass raw materials and glass cullet, or may be glass cullet alone. Further, the raw material of the pre-melt may be heated and melted after being charged into the housing portion 21, or may be charged into the housing portion 21 after being melted in a separate apparatus from the melting apparatus 2.

First Modified Example

Figure 5A:
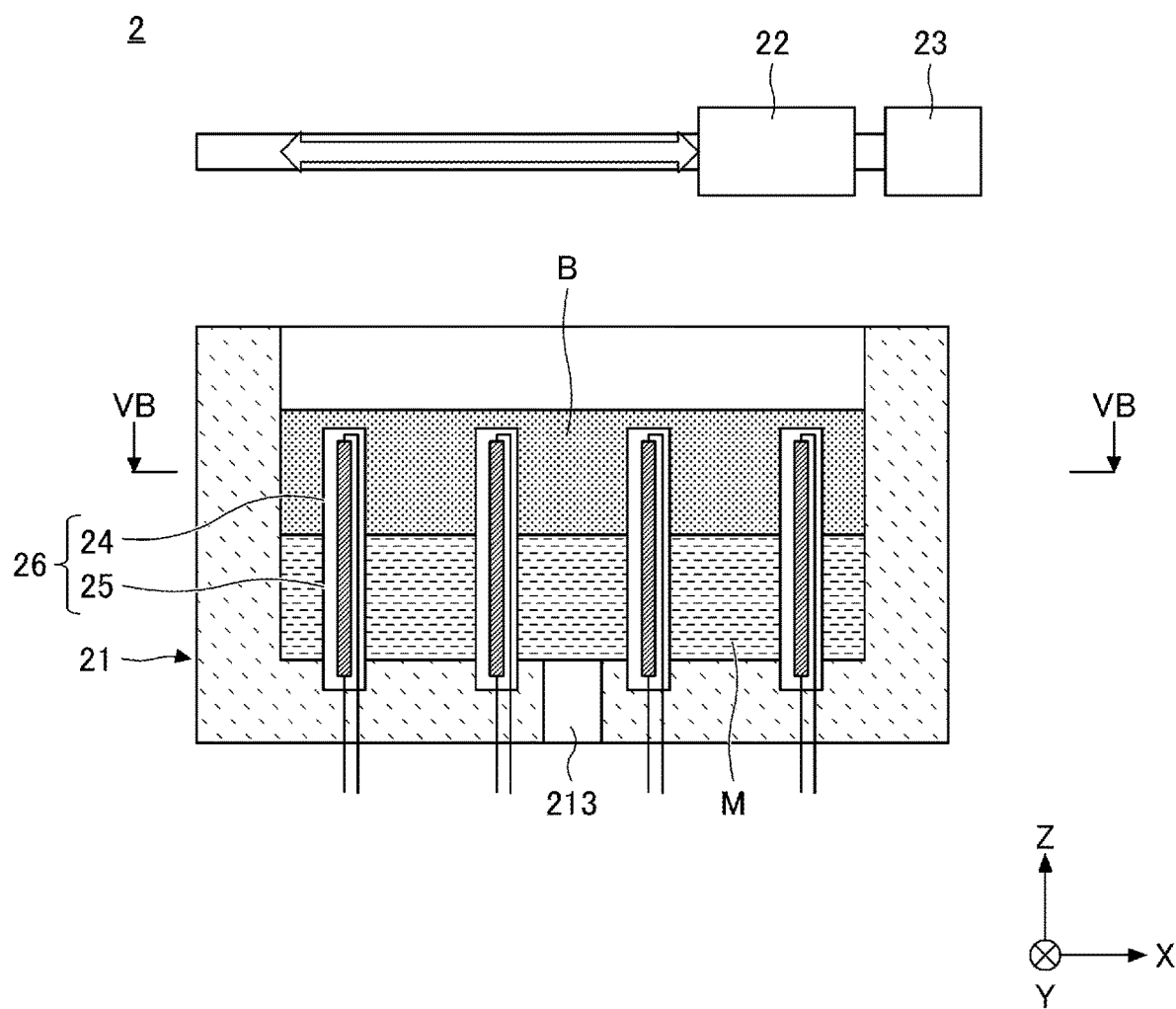
FIG. 5A is an elevational cross-sectional view illustrating a melting apparatus according to a first modified example.

FIG. 5A is an elevational cross-sectional view illustrating a melting apparatus according to a first modified example. FIG. 5B is a plan cross-sectional view illustrating the melting apparatus according to the first modified example, the plan cross-sectional view being taken along the line VB-VB of FIG. 5A. As the flowchart of the method of producing the melt according to the first modified example is the same as in FIG. 4 of the above embodiment, the flowchart is omitted. Hereinafter, the differences between this modified example and the above embodiments are explained below.

A melting apparatus 2 includes a housing portion 21, a charging portion 22, a moving portion 23, a first heating element 24, and a second heating element 25. The first heating element 24 and the second heating element 25 of the first modified example are arranged continuously on the same vertical line and are integrated. One heating unit 26 serves as both the first heating element 24 and the second heating element 25.

The heating unit 26 is placed vertically, it does not flex and deform due to gravity, unlike the case where the heating unit 26 is placed horizontally. The higher the temperature of the heating unit 26 is, the easier the heating unit 26 becomes soft. Therefore, the more pronounced the effect of suppressing flexural deformation due to gravity can be obtained.

The heating unit 26 is a vertical rod-shape. The length of the vertical rod-shaped heating unit 26 and a heat resistance of the heating unit 26 do not vary with the size of the area of the inner bottom surface of the housing portion 21. Therefore, the inner bottom surface of the rousing portion 21 can be made larger, and the amount of melt produced by the melting apparatus 2 per day can be increased.

The heating unit 26 is a vertical rod-shape, but the heating unit 26 may be a vertical plate-shape to increase the contact area with the solid-liquid mixture layer B and the melt layer M. The vertical plate-shaped heating unit 26 does not obstruct the flow of batch raw material or melt in the vertical direction.

Although the heating unit 26 may project upward from the upper surface of the solid-liquid mixture layer B, the heating unit 26 is preferably placed below the upper surface of the solid-liquid mixture layer B, as illustrated in FIG. 5A. As the gas above the solid-liquid mixture layer B does not have to be heated by the heating unit 26, wasteful use of thermal energy can be prevented.

Second Modified Example

Figure 6:
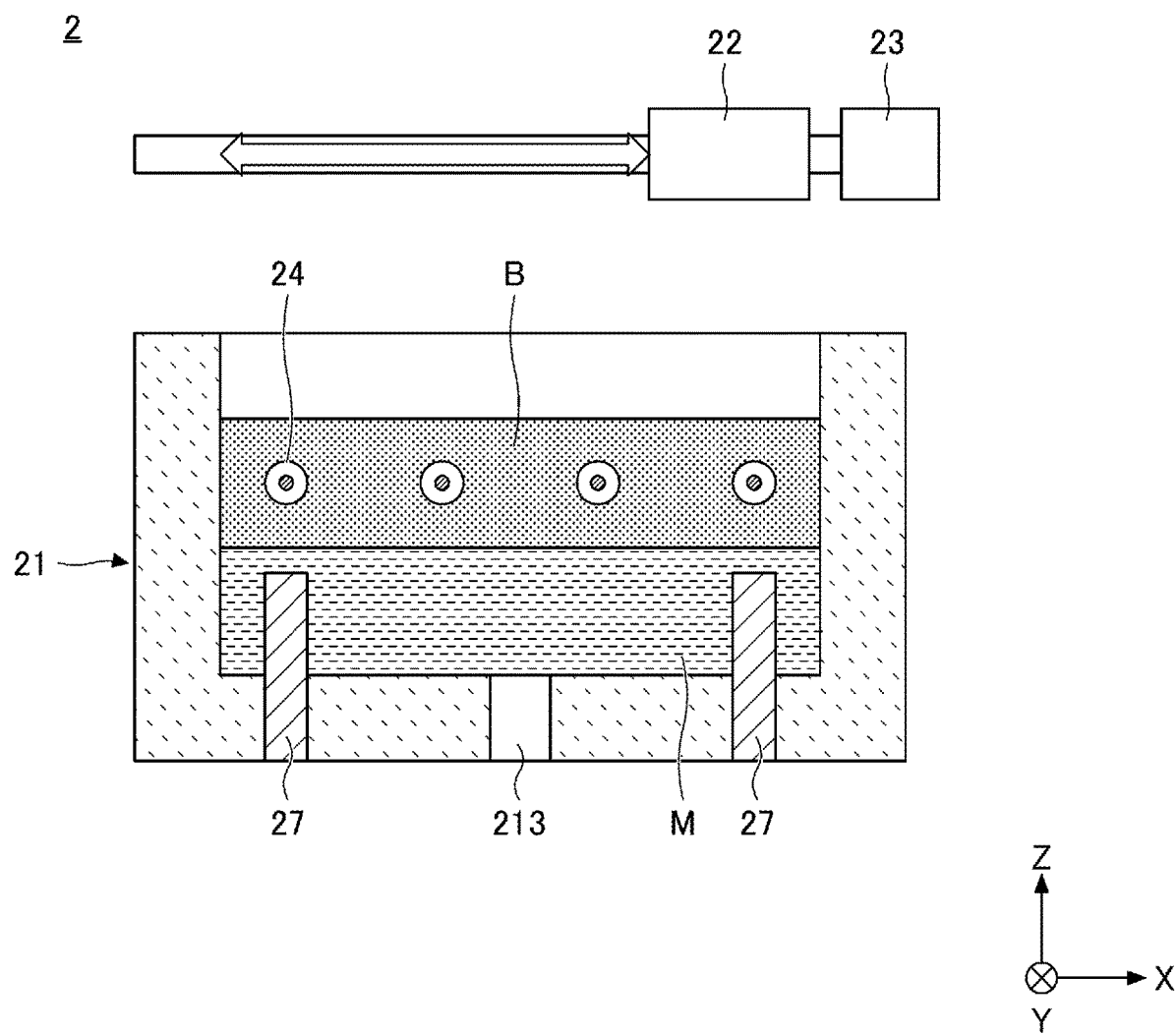
FIG. 6 is an elevational cross-sectional view illustrating a melting apparatus according to a second modified example.

FIG. 6 is an elevational cross-sectional view illustrating a melting apparatus according to a second modified example. As the plan cross-sectional view of the melting apparatus for the second modified example is the same as FIG. 3B of the above embodiment, the figure is omitted. Furthermore, as the flowchart of the method of producing the melt according to the second modified example is the same as in FIG. 4 of the above embodiment, the flowchart is omitted. Hereinafter, the differences between this modified example and the above embodiments are explained below.

A melting apparatus 2 includes a housing portion 21, a charging portion 22, a moving portion 23, a first heating element 24, and a pair of electrodes 27 in place of the second heating element 25 as illustrated in FIG. 3A. When a voltage is applied to the pair of electrodes 27, an electric current flows through the melt layer M, and the melt layer M itself generates heat.

Third Modified Example

Figure 7A:
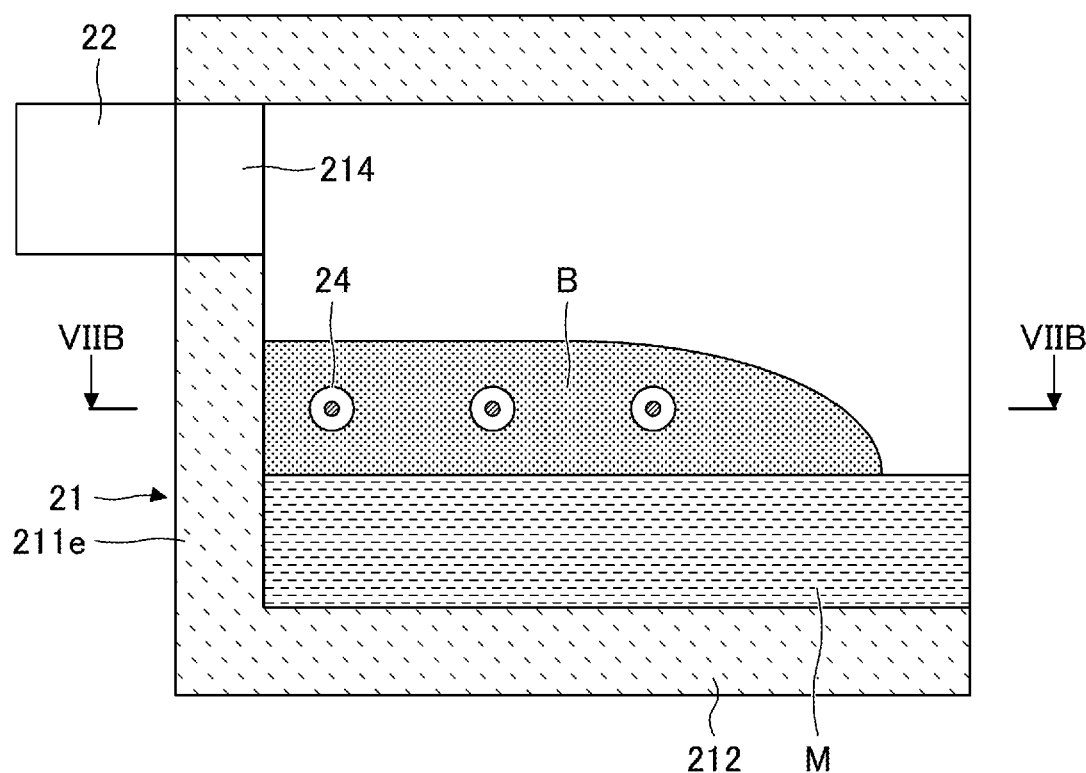
FIG. 7A is an elevational cross-sectional view illustrating a melting apparatus according to a third modified example, the elevational cross-sectional view being taken along the line VIIA-VIIA of FIG. 7B.
Figure 7B:
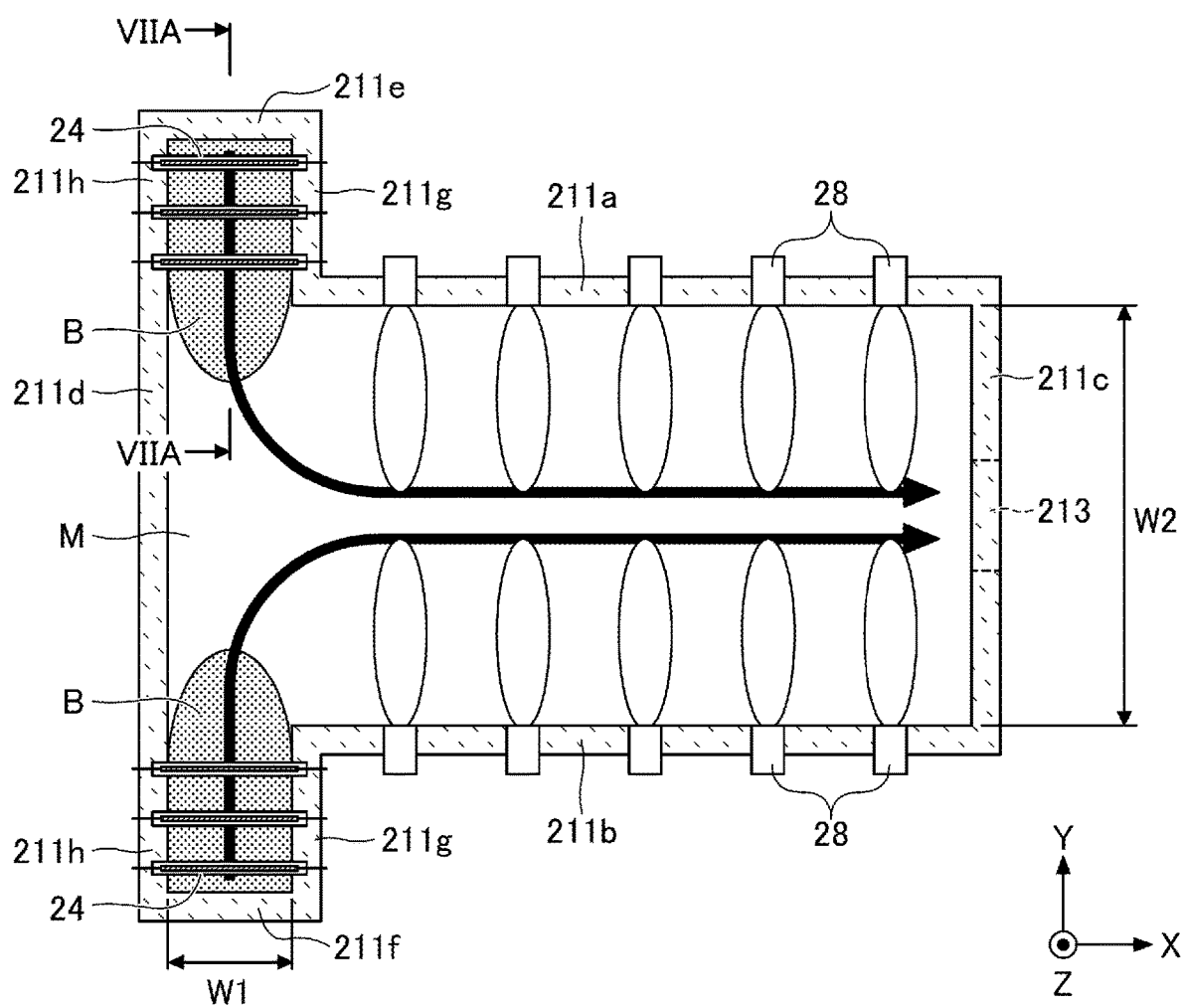
FIG. 7B is a plan cross-sectional view illustrating the melting apparatus according to the third modified example, the plan cross-sectional view being taken along the line VIIB-VIIB of FIG. 7A.

FIG. 7A is an elevational cross-sectional view illustrating a melting apparatus according to a third modified example, the elevational cross-sectional view being taken along the line VIIA-VIIA of FIG. 7B. FIG. 7B is a plan cross-sectional view illustrating the melting apparatus according to the third modified example, the plan cross-sectional view being taken along the line VIIB-VIIB of FIG. 7A. As the flowchart of the method of producing the melt according to the third modified example is the same as in FIG. 4 of the above embodiment, the flowchart is omitted. Hereinafter, the differences between this modified example and the above embodiments are described.

The melting apparatus 2 includes a housing portion 21, and the housing portion 21 includes a pair of left and right side walls 211a, 211b and a pair of front and rear side walls 211c, 211d. The left-right direction is the Y-axis direction. The left side is the positive direction in the Y-axis, and the right side is the negative direction in the Y-axis. The front and rear directions are the X-axis. The front side is the positive direction in the X-axis, and the rear side is the negative direction in the X-axis.

The pair of left and right side walls 211a and 211b each have a hole through which a burner 28 is inserted. The holes are a plurality of holes, arranged at intervals in the front-back direction. The burner 28 forms a flame above the exposed surface of the melt layer M, which is exposed from the solid-liquid mixture layer B. The radiant heat of the flame heats mainly the exposed surface of the melt layer M. As the melt layer M has a higher thermal diffusivity than the solid-liquid mixture layer B, the radiant heat of the flame is easily transferred to the inside of the melt layer M.

In the pair of front and rear side walls 211c and 211d, a melt outlet 213 is formed on the front side wall 211c. The melt outlet 213 may be formed in a bottom wall 212, in which case the melt outlet 213 may be formed near the front side wall 211c. On the other hand, the rear side wall 211d may have a charging port 214 for a batch raw material, but the charging port 214 in this modified example is formed in each of the pair of left and right sub-side walls 211e and 211f described below.

The housing portion 21 has a pair of left and right, sub-side walls 211e and 211f, and two sets of front and rear sub-side walls 211g and 211h. The pair of left and right sub-side walls 211e and 211f are placed outside of the pair of left and right side walls 211a and 211b. The left side sub-side wall 211e and one set of a pair of front and rear sub-side walls 211g and 211h are arranged in a U-shape in plan view. Similarly, the right side sub-side wall 211f and the other set of the pair of front and rear sub-side walls 211g and 211h are arranged in a U-shape in plan view. The rear sub-side wall 211h and the rear side wall 211d are arranged on the same side. As illustrated by the arrows in FIG. 7B in plan view, the batch raw material is fed from the pair of left and right sub-side walls 211e and 211f, subsequently flows inward in the left and right direction between the pair of front and rear sub-side walls 211g and 211h while denaturing, and flows toward the front between the pair of left and right side walls 211a and 211b.

The solid-liquid mixture layer B is formed mainly between the pair of front and rear sub-side walls 211g and 211h. Therefore, the first heating element 24 is horizontally bridged from one side of the pair of the front and rear sub-side walls 211g and 211h to the other side. The distance W1 between the pair of front and rear sub-side walls 211g and 211h is narrower than the distance W2 between the pair of left and right side walls 211a and 211b. The horizontal rod-shaped first heating element 24 is bridged between the relatively narrowly spaced pair of front and rear sub-side walls 211g and 211h. Therefore, the length of the first heating element 24 can be shortened and thermal deformation of the first heating element 24 can be suppressed.

The first heating element 24 is in direct contact with the inside of the solid-liquid mixture layer B and provides thermal energy to the solid-liquid mixture layer B by heat transfer. The solid-liquid mixture layer B can be heated efficiently. Therefore, the area of the upper surface of the melt layer M that is covered by the solid-liquid mixture layer B can be reduced, and the area of the exposed surface can be increased. The melt layer M receives the radiant heat of the flame on its exposed surface. Therefore, the melt layer M can be heated efficiently. When the amount of melt produced per day is high, that is, even when batch raw materials are fed frequently, the area of the exposed surface of the melt layer M can be secured and the melt layer M can be heated efficiently.

The radiant heat of the flame heats mainly the exposed surface of the melt layer M, as described above. However, part of the radiant heat of the flame heats the solid-liquid mixture layer B from diagonally above. On the other hand, the first heating element 24 heats the solid-liquid mixture layer B from the inside. The first heating element 24 is a horizontal rod. Therefore, the first heating element 24 can evenly heat the solid-liquid mixture layer B that spreads horizontally, thereby reducing uneven heating of the solid-liquid mixture layer B. As a result, the separation of components that melt at low temperatures from those that melt at high temperatures, known as a melting segregation, can be suppressed, and the uneven quality of glass can be suppressed.

The melting apparatus 2 of this modified example does not include the second heating element 25 of the above embodiment and the pair of electrodes 27 of the second modified example, but the melting apparatus 2 may include at least one of the second heating element 25 and the pair of electrodes 27. At least one of the second heating element 25 and the pair of electrodes 27 can be used to heat the melt layer M. In particular, it is effective to heat the part of the melt layer M that is directly below the solid-liquid mixture layer B. This is because the area directly under the solid-liquid mixture layer is difficult to be heated by the radiant heat of the flame of the burner 28.

Fourth Modified Example

Figure 8:
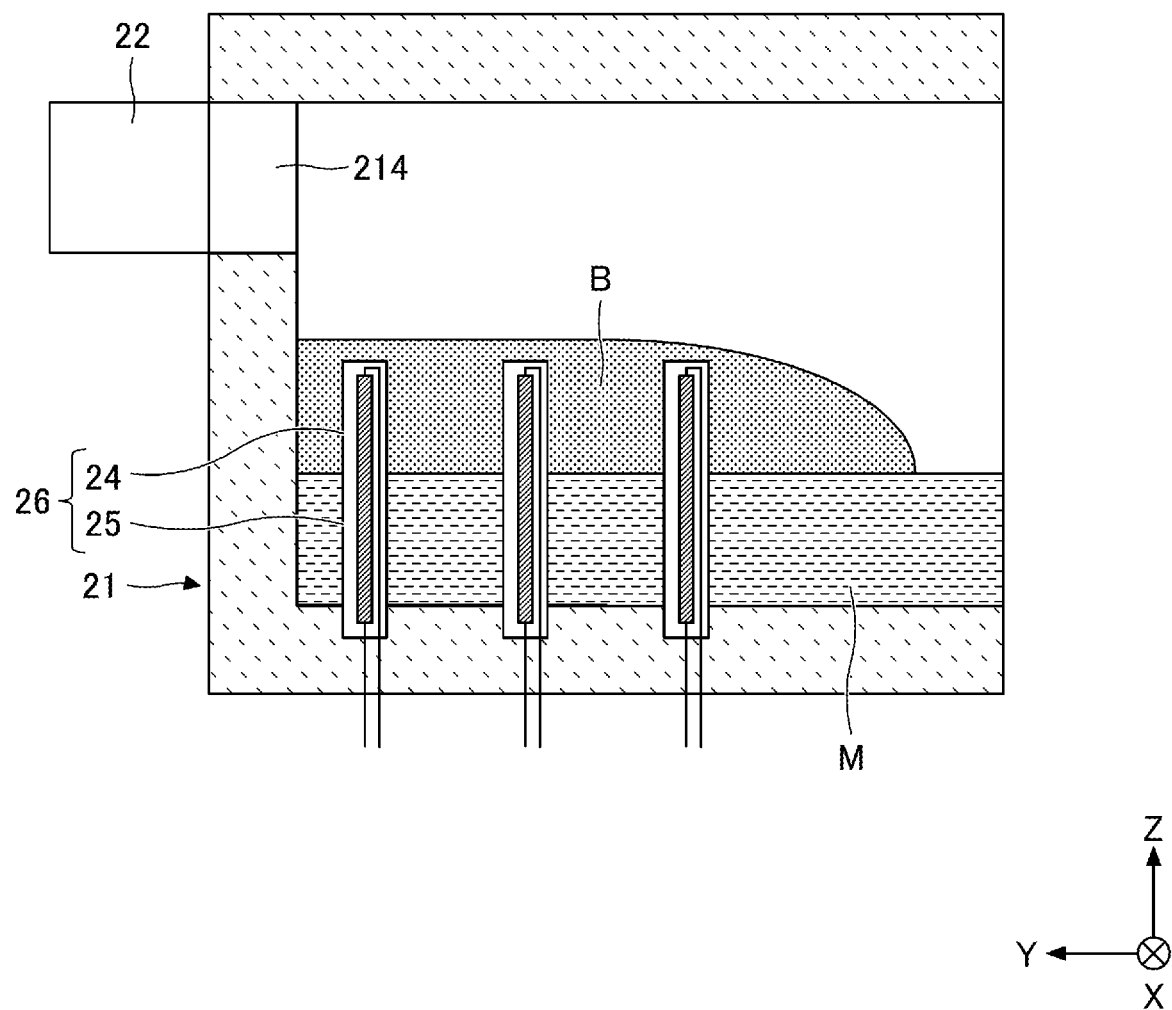
FIG. 8 is an elevational cross-sectional view illustrating a melting apparatus according to a fourth modified example.

FIG. 8 is an elevational cross-sectional view illustrating a melting apparatus according to a fourth modified example. As the plan cross-sectional view of the melting apparatus for the fourth modified example is the same as FIG. 7B of the third modified example, the figure is omitted. Furthermore, as the flowchart of the method of producing the melt according to the fourth modified example is the same as in FIG. 4 of the above embodiment, the flowchart is omitted. Hereinafter, the differences between this modified example and the above embodiments, plus the third modified example are explained below.

The melting apparatus 2 of this modified example includes a first heating element 24 and a second heating element 25, in the same manner as the first modified example of the above. The first heating element 24 and the second heating element 25 of this modified example are arranged continuously on the same vertical line and are integrated. One heating unit 26 serves as both the first heating element 24 and the second heating element 25. Accordingly, the part of the melt layer M directly below the solid-liquid mixture layer B can be heated.

The present disclosure is not limited to the above embodiments and the like, although the method of producing a melt, the method of producing a glass article, the melting apparatus, and the equipment for producing a glass article are described above. Various changes, modifications, substitutions, additions, deletions, and combinations are possible within the scope of the claims. These naturally fall within the technical scope of the present disclosure.

What is claimed is:

1. A method of producing a melt, comprising:
    directly contacting a first heating element with an inside of a solid-liquid mixture layer including a batch raw material of glass and a mixture of solid and liquid phases denatured from the batch raw material to apply thermal energy to the solid-liquid mixture layer by heat transfer from the first heating element;
    supplying the batch raw material from above the solid-liquid mixture layer; and
    continuously producing a liquid phase melt without using electrodes to Joule heat the solid-liquid mixture layer, the liquid phase melt having a bulk density greater than that of the solid-liquid mixture layer in a lower layer in contact with the solid-liquid mixture layer,
    wherein a thermal diffusivity of the solid-liquid mixture layer is 3 $mm^2$/second or less, the first heating element includes an electric resistance heating element or a heat exchanger tube, and the first heating element does not include electrodes for Joule heating the melt.

2. The method according to claim 1, further comprising:
    directly contacting a second heating element with an inside of a melt layer formed of the melt to apply thermal energy to the melt layer by heat transfer from the second heating element.

3. The method according to claim 2, wherein the second heating element includes electrodes configured to Joule heat the melt.

4. The method according to claim 1, wherein the solid-liquid mixture layer covers 70% or more of an upper surface of the melt layer formed of the melt.

5. A method of producing a glass article, comprising:
    forming the melt produced by the method of claim 1;
    annealing the formed glass; and
    processing the annealed glass into a glass article.

6. The method according to claim 1, wherein the directly contacting the first heating element with the inside of the solid-liquid mixture layer applies the thermal energy to the solid-liquid mixture layer by the heat transfer from the first heating element without using electrodes to Joule heat the solid-liquid mixture layer.

7. The method according to claim 1, wherein the first heating element is placed below an upper surface of the solid-liquid mixture layer and above a lower surface of the solid-liquid mixture layer.

8. The method according to claim 1, wherein the directly contacting the first heating element with the inside of the solid-liquid mixture layer applies the thermal energy to the solid-liquid mixture layer by the heat transfer from the first heating element without using electrodes to Joule heat the solid-liquid mixture layer, and the first heating element is placed below an upper surface of the solid-liquid mixture layer and above a lower surface of the solid-mixture layer.

* * * * *